United States Patent
Cheng et al.

(10) Patent No.: US 9,363,047 B2
(45) Date of Patent: Jun. 7, 2016

(54) TECHNIQUE OF ENCODING HARQ FEEDBACK INFORMATION WITH TWO SEPARATE CODEWORDS WITH UNEQUAL ERROR PROTECTION FOR DTX AND ACK/NACK

(75) Inventors: Jung-Fu Cheng, Fremont, CA (US); Robert Baldemair, Solna (SE); Dirk Gerstenberger, Stockholm (SE); Daniel Larsson, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 950 days.

(21) Appl. No.: 13/579,022

(22) PCT Filed: Jun. 2, 2010

(86) PCT No.: PCT/EP2010/003353
§ 371 (c)(1),
(2), (4) Date: Aug. 14, 2012

(87) PCT Pub. No.: WO2011/101000
PCT Pub. Date: Aug. 25, 2011

(65) Prior Publication Data
US 2013/0010690 A1 Jan. 10, 2013

Related U.S. Application Data

(60) Provisional application No. 61/304,994, filed on Feb. 16, 2010.

(51) Int. Cl.
*H04W 4/00* (2009.01)
*H04L 5/00* (2006.01)
(Continued)

(52) U.S. Cl.
CPC .............. *H04L 5/0005* (2013.01); *H04L 1/007* (2013.01); *H04L 1/0073* (2013.01);
(Continued)

(58) Field of Classification Search
CPC ... H04L 5/0005; H04L 1/0073; H04L 1/0088; H04L 1/007; H04L 1/1607; H04L 27/2601; H04L 2001/0098; H04L 2001/125; H04L 5/0053; H04L 5/0055; H04L 1/1864; H04L 1/1858; H04L 1/1845; H04L 1/1819; H04L 1/1812; H04L 1/0072; H04W 72/0406; H04W 72/0413; H04W 72/042; H04W 52/0209; H04W 76/048
USPC ......................................... 370/328, 278, 282
See application file for complete search history.

(56) References Cited

U.S. PATENT DOCUMENTS

2009/0129317 A1* 5/2009 Che et al. ................. 370/328
2009/0219897 A1* 9/2009 Pajukoski et al. ......... 370/336
(Continued)

OTHER PUBLICATIONS

3rd Generation Partnership Project, "Remaining Issues for ACK/NAK on PUSCH in LTE TDD." Nokia et al. 3GPP TSG RAN WG1 Meeting #54bis. R1-083723. Prague, Czech Republic, Sep. 29-Oct. 3, 2008.
(Continued)

*Primary Examiner* — Kwang B Yao
*Assistant Examiner* — Ricardo Castaneyra
(74) *Attorney, Agent, or Firm* — Coats & Bennett, PLLC (57) ABSTRACT

A technique for encoding downlink Hybrid Automatic Repeat Request, HARQ, feedback information in a mobile station supporting aggregated component carriers is provided. A method implementation of this technique comprises the steps of obtaining (302) first HARQ feed-back indicators providing information regarding receipt of Physical Downlink Control Channels, PDCCH, for activated component carriers, obtaining (304) second HARQ feedback indicators providing information regarding decoding of Physical Downlink Shared Channels, PDSCH, codewords carried by the component carriers, encoding (306) the first HARQ feedback indicators into a first coded part, and encoding (308) the first HARQ feedback indicators into a second coded part, wherein the first and the second HARQ feedback indicators are encoded separate from each other.

8 Claims, 7 Drawing Sheets

(51) Int. Cl.
*H04L 1/18* (2006.01)
*H04W 76/04* (2009.01)
*H04L 1/00* (2006.01)
*H04L 1/16* (2006.01)
*H04L 27/26* (2006.01)
*H04L 1/12* (2006.01)

(52) U.S. Cl.
CPC ........... *H04L 1/0088* (2013.01); *H04L 1/1607* (2013.01); *H04L 1/1812* (2013.01); *H04L 1/1864* (2013.01); *H04L 5/0053* (2013.01); *H04L 27/2601* (2013.01); *H04W 76/048* (2013.01); *H04L 2001/0098* (2013.01); *H04L 2001/125* (2013.01)

(56) References Cited

U.S. PATENT DOCUMENTS

| | | |
|---|---|---|
| 2009/0225700 A1 | 9/2009 | Shen et al. |
| 2009/0300456 A1* | 12/2009 | Pelletier et al. ............... 714/749 |
| 2010/0118720 A1* | 5/2010 | Gauvreau et al. ............. 370/252 |
| 2010/0172433 A1* | 7/2010 | Li et al. .......................... 375/295 |
| 2010/0271970 A1* | 10/2010 | Pan et al. ....................... 370/252 |
| 2010/0272048 A1* | 10/2010 | Pan et al. ....................... 370/329 |
| 2011/0261679 A1* | 10/2011 | Li et al. .......................... 370/216 |

OTHER PUBLICATIONS

Ghosh et al., "Uplink Control Channel Design for 3GPP LTE." 18th Annual IEEE International Symposium on Personal, Indoor and Mobile Radio Communications (PIMRC'07). Sep. 1, 2007, pp. 1-5.

3rd Generation Partnership Project, "On PUCCH Resource Allocation for Carrier Aggregation." Ericsson et al. 3GPP TSG-RAN WG1 #60. R1-100845. San Francisco, CA, Feb. 22-26, 2010.

3rd Generation Partnership Project, "A/N transmission in the uplink for carrier aggregation." Ericsson et al. 3GPP TSG-RAN WG1 #60. San Francisco, CA, Feb. 22-26, 2010.

* cited by examiner

TECHNIQUE OF ENCODING HARQ FEEDBACK INFORMATION WITH TWO SEPARATE CODEWORDS WITH UNEQUAL ERROR PROTECTION FOR DTX AND ACK/NACK

TECHNICAL FIELD

The present invention generally relates to the technical field of encoding downlink (DL) Hybrid Automatic Repeat Request (HARQ) feedback information. In particular, the invention relates to a technique of encoding DL HARQ feedback information using first HARQ feedback indicators that are providing information regarding receipt of Physical Downlink Control Channels (PDCCH) for activated component carriers and second HARQ feedback indicators that are providing information regarding decoding of Physical Downlink Shared Channel (PDSCH) codewords carried by the component carriers.

BACKGROUND

The HARQ protocol is a variation of the ARQ error-control protocol. In standard ARQ, Error Detection (ED) information bits are added to data to be transmitted, such as Cyclic Redundancy Check (CRC) bits. In HARQ, Forward Error Correction (FEC) bits are further added to the ED bits. HARQ is used in High-Speed Downlink Packet Access (HSDPA), High-Speed Uplink Packet Access (HSUPA), and 3GPP Long Term Evolution (LTE) data transmissions.

To enhance radio link reliability, the HARQ protocol requires the receiver of a data transmission to communicate an ACK or NACK indicator back to the sender. When an ACK indicator is sent back, the sender can proceed to transmit the next data packets. When a NACK indicator is received by the sender, coded bits corresponding to the previous transmission are transmitted to the receiver.

Standard document 3GPP TS 36.212 V9.1.0 (2010-03), 3rd Generation Partnership Project, Technical Specification Group Radio Access Network, Evolved Universal Terrestrial Radio Access (E-UTRA), Multiplexing and channel coding (Release 9) specifies coding, multiplexing and mapping to physical channels for E-UTRA. Therein, coding of HARQ feedback information is described.

In the LTE system, a User Equipment (UE) is notified by the network about PDCCH DL data transmissions. The PDCCH is a transmission channel that is used to transfer control information to UEs. The PDCCH defines how the paging channel and shared DL channels are configured and it defines uplink (UL) transmission scheduling information to help coordinate access control to the radio system. Upon receipt of a PDCCH in a particular subframe T, the UE is required to send back the ACK/NACK indicator in a Physical Uplink Control Channel (PUCCH) at a subsequent subframe T+k. PUCCH is generally used to transport user signaling data from one or more UEs that can transmit on the control channel. PUCCH transports the acknowledgment responses and retransmission requests, sends service scheduling requests, and transfers channel quality information measured by the UE to the system. In the Frequency Division Duplex (FDD) mode of LTE, a fixed time delay k can be used since the UL radio resources are always available. Furthermore, each ACK/NACK feedback indicator in the UL direction corresponds to a unique DL transmission.

Figure 1:
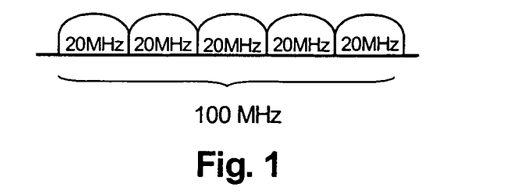
FIG. 1 is a schematic block diagram showing an aggregated carrier bandwidth of 100 MHz.

In 3GPP LTE Rel-10 ("LTE-Advanced"), bandwidths larger than 20 MHz are supported while backwards compatibility with 3GPP LTE Rel-8 is supported. This is achieved by aggregating multiple component carriers, each of which can be 3GPP LTE Rel-8 compatible, to form a larger overall bandwidth for an UE that is 3GPP LTE Rel-10 compatible. FIG. 1 shows an aggregated carrier bandwidth of 100 MHz, wherein each of the component carriers is separately processed.

Figure 2:
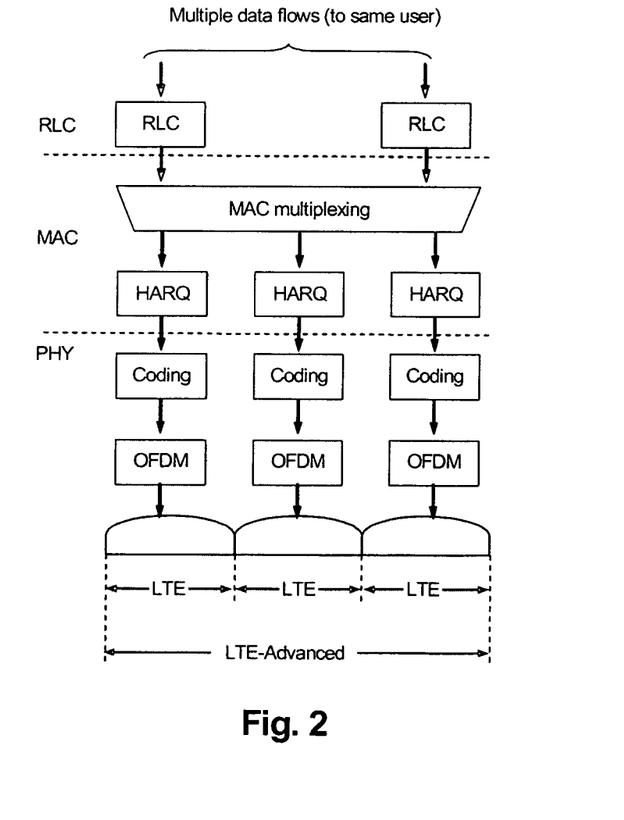
FIG. 2 is a schematic block diagram showing the RLC, MAC and PHY layers for an LTE system having multiple component carriers.

FIG. 2 schematically illustrates the Radio Link Control (RLC), Medium Access Control (MAC), and Physical (PHY) layers for an LTE system having multiple component carriers. As can be seen from FIG. 2, HARQ is operated separately on each component carrier. For HARQ operation, acknowledgements informing the transmitter on whether the reception of a transport block was successful or not are provided. For this, multiple acknowledgement messages, i.e., one per component carrier, are transmitted. In case of spatial multiplexing, an acknowledgement message corresponds to two bits as there are two transport blocks on one component carrier. In absence of spatial multiplexing, an acknowledgement message is a single bit as there is only a single transport block per component carrier.

The number of aggregated component carriers as well as the bandwidth of the individual component carrier may be different for UL and DL transmissions. A symmetric configuration refers to the case where the number of component carriers in DL and UL is the same whereas an asymmetric configuration refers to the case that the number of component carriers is different. The number of component carriers configured in a cell may be different from the number of component carriers seen by an UE. For example, an UE may support more DL component carriers than UL component carriers, even though the cell is configured with the same number of UL and DL component carriers. To reduce UE power consumption and implementation costs, PUCCH is transmitted on a semi-statically configured UL component carrier (a so-called "anchor carrier").

In 3GPP systems, fast activation and de-activation of DL component carriers is supported. Thereby, the UE is enabled to monitor only those component carriers that the network schedules most of the time for the UE. Activation and de-activation can be based on L1/L2 control signaling or MAC control elements. Upon activation of a DL component carrier, an UE has to be able to receive PDSCH thereon. The PDSCH is used to send common user data and control information (such as paging messages) to all UEs operating within its coverage area. Therefore, the maximum number of simultaneous DL assignments that an UE can receive is limited by the number of activated component carriers (denoted herein by "n"). The actual number of assignments can vary between 0 and the number of activated component carriers. Furthermore, even if an UE is scheduled on n component carriers, the UE may only be able to successfully decode less than n PDCCHs carrying DL assignments. This event is in the following referred to as "DTX".

With n activated component carriers and all component carriers configured for single-codeword transmissions, it is necessary to signal three possible HARQ messages per component carrier, i.e., {ACK, NACK, DTX}. Excluding the case where none of the PDCCHs is received correctly by the UE, there are $3^n-1$ possible HARQ messages, which require $\lceil \log_2(3^n-1) \rceil$ binary bits for representation. An example of HARQ message encoding for n=3 component carriers with single-codeword scheduling is shown in Table 1. In Table 1, A=ACK, N=NACK, and D=DTX.

TABLE 1

HARQ message encoding for n = 3 component carriers with
single-codeword scheduling

| Indicator | Binary |
|---|---|
| AAA | 00000 |
| NAA | 00001 |
| DAA | 00010 |
| ANA | 00011 |
| NNA | 00100 |
| DNA | 00101 |
| ADA | 00110 |
| NDA | 00111 |
| DDA | 01000 |
| AAN | 01001 |
| NAN | 01010 |
| DAN | 01011 |
| ANN | 01100 |
| NNN | 01101 |
| DNN | 01110 |
| ADN | 01111 |
| NDN | 10000 |
| DDN | 10001 |
| AAD | 10010 |
| NAD | 10011 |
| DAD | 10100 |
| AND | 10101 |
| NND | 10110 |
| DND | 10111 |
| ADD | 11000 |
| NDD | 11001 |

Table 1 shows that the translation from a HARQ message to its binary representation is rather irregular. The transformation between the HARQ messages and the binaries is provided by means of a look-up table. For the maximum number of five activated component carriers (as envisioned for 3GPP LTE Rel-10), the look-up table has 242 entries.

The numbers of possible HARQ messages grows significantly when the system is operated with multiple antennas. For a simplified example, it is assumed that all n activated component carriers use dual-codeword transmissions. Thus, five possible HARQ messages have to be signaled per component carrier, i.e., {(ACK, ACK), (ACK, NACK), (NACK, ACK), (NACK, NACK), (DTX)}. Hence, there are $5^n-1$ possible HARQ messages, which require $\lceil \log_2(5^n-1) \rceil$ binary bits for representation. Thus, for five activated component carriers (as envisioned for 3GPP LTE Rel-10), a general look-up table can have $5^5-1=3124$ entries.

Since different component carriers can exhibit different operating conditions due to different transmission and interference characteristics, it is necessary to allow flexibility in assigning different numbers of transmitted codewords to different component carriers for higher system operation performance. Standard document 3GPP TS 25.212 V9.2.0 (2010-03), 3GPP, Technical Specification Group Radio Access Network, Multiplexing and Channel Coding (FDD), (Release 9) discloses to signal seven possible HARQ messages per component carrier, i.e., {(ACK, ACK), (ACK, NACK), (NACK, ACK), (NACK, NACK), (ACK), (NACK), (DTX)}.

Table 2 shows a HARQ message encoding table for n=2 component carriers for High Speed Packet Access (HSPA) Release 9. Table 2 has been reproduced from Table 15C.2 of document 3GPP TS 25.212 V9.2.0. Table 2 contains $7^2-1=48$ entries. For the maximum number of five activated component carriers (as envisioned for 3GPP LTE Rel-10), a general look-up table can have $7^5-1=16806$ entries.

TABLE 2

HARQ message encoding for n = 2 component carriers for
HSPA (Release 9)

| Indicator | B | i | n | a | r | y | | | | |
|---|---|---|---|---|---|---|---|---|---|---|
| A/D | 1 | 1 | 1 | 1 | 1 | 1 | 1 | 1 | 1 | 1 |
| N/D | 0 | 0 | 0 | 0 | 0 | 0 | 0 | 0 | 0 | 0 |
| AA/D | 1 | 0 | 1 | 0 | 1 | 1 | 1 | 1 | 0 | 1 |
| AN/D | 1 | 1 | 0 | 1 | 0 | 1 | 0 | 1 | 1 | 1 |
| NA/D | 0 | 1 | 1 | 1 | 1 | 0 | 1 | 0 | 1 | 1 |
| NN/D | 1 | 0 | 0 | 1 | 0 | 0 | 1 | 0 | 0 | 0 |
| D/A | 0 | 0 | 0 | 0 | 0 | 0 | 1 | 1 | 1 | 1 |
| D/N | 1 | 1 | 1 | 1 | 1 | 1 | 0 | 0 | 0 | 0 |
| D/AA | 1 | 0 | 0 | 0 | 1 | 0 | 0 | 0 | 1 | 1 |
| D/AN | 0 | 1 | 0 | 0 | 0 | 0 | 1 | 1 | 0 | 1 |
| D/NA | 0 | 0 | 0 | 1 | 1 | 1 | 1 | 1 | 1 | 0 |
| D/NN | 1 | 1 | 1 | 1 | 1 | 0 | 0 | 1 | 0 | 0 |
| A/A | 1 | 1 | 0 | 1 | 0 | 0 | 0 | 0 | 1 | 1 |
| A/N | 0 | 0 | 1 | 1 | 1 | 0 | 1 | 0 | 0 | 1 |
| N/A | 1 | 0 | 0 | 1 | 0 | 1 | 1 | 1 | 0 | 0 |
| N/N | 0 | 1 | 1 | 0 | 0 | 1 | 0 | 1 | 0 | 1 |
| A/AA | 1 | 0 | 1 | 0 | 0 | 1 | 1 | 0 | 0 | 0 |
| A/AN | 1 | 0 | 0 | 1 | 0 | 1 | 0 | 1 | 0 | 1 |
| A/NA | 0 | 0 | 1 | 1 | 1 | 0 | 1 | 0 | 0 | 1 |
| A/NN | 0 | 1 | 1 | 1 | 0 | 1 | 0 | 0 | 1 | 1 |
| N/AA | 1 | 1 | 0 | 1 | 0 | 0 | 1 | 0 | 1 | 0 |
| N/AN | 1 | 1 | 0 | 0 | 0 | 1 | 0 | 1 | 1 | 0 |
| N/NA | 0 | 1 | 1 | 0 | 1 | 0 | 1 | 0 | 1 | 0 |
| N/NN | 0 | 0 | 1 | 0 | 1 | 0 | 1 | 0 | 0 | 1 |
| AA/A | 0 | 1 | 1 | 0 | 0 | 0 | 1 | 0 | 0 | 0 |
| AA/N | 1 | 1 | 1 | 0 | 0 | 1 | 1 | 0 | 1 | 0 |
| AN/A | 1 | 0 | 1 | 1 | 1 | 0 | 0 | 1 | 1 | 0 |
| AN/N | 0 | 0 | 1 | 1 | 0 | 1 | 0 | 0 | 0 | 1 |
| NA/A | 0 | 1 | 0 | 1 | 1 | 1 | 1 | 1 | 0 | 0 |
| NA/N | 1 | 0 | 0 | 0 | 1 | 0 | 0 | 0 | 0 | 1 |
| NN/A | 0 | 0 | 0 | 0 | 1 | 1 | 0 | 0 | 1 | 0 |
| NN/N | 0 | 1 | 0 | 0 | 0 | 1 | 1 | 0 | 0 | 1 |
| AA/AA | 0 | 1 | 1 | 0 | 1 | 1 | 0 | 1 | 1 | 1 |
| AA/AN | 1 | 0 | 1 | 1 | 0 | 0 | 1 | 1 | 1 | 1 |
| AA/NA | 1 | 1 | 0 | 1 | 1 | 1 | 1 | 0 | 0 | 1 |
| AA/NN | 0 | 1 | 1 | 1 | 0 | 1 | 1 | 1 | 0 | 0 |
| AN/AA | 0 | 0 | 0 | 1 | 1 | 0 | 0 | 1 | 0 | 1 |
| AN/AN | 1 | 1 | 1 | 0 | 0 | 0 | 0 | 0 | 0 | 1 |
| AN/NA | 1 | 0 | 0 | 0 | 0 | 1 | 0 | 1 | 0 | 0 |
| AN/NN | 0 | 0 | 1 | 1 | 0 | 1 | 0 | 0 | 0 | 1 |
| NA/AA | 1 | 1 | 0 | 0 | 1 | 0 | 1 | 1 | 1 | 0 |
| NA/AN | 0 | 0 | 1 | 0 | 1 | 0 | 1 | 0 | 0 | 0 |
| NA/NA | 1 | 0 | 1 | 1 | 1 | 1 | 0 | 0 | 1 | 0 |
| NA/NN | 1 | 1 | 1 | 0 | 0 | 1 | 1 | 0 | 1 | 0 |
| NN/AA | 0 | 1 | 0 | 1 | 0 | 0 | 0 | 0 | 1 | 0 |
| NN/AN | 0 | 0 | 1 | 0 | 0 | 0 | 1 | 1 | 1 | 0 |
| NN/NA | 0 | 1 | 0 | 0 | 1 | 1 | 0 | 0 | 0 | 0 |
| NN/NN | 0 | 0 | 0 | 0 | 0 | 1 | 1 | 0 | 1 | 1 |

Existing encoding schemes require a fixed-length error correction coding scheme for a particular number of activated component carriers. For example, a forward error correction code for n=5 activated component carriers has to be able to carry 12 HARQ information bits regardless of how many PDCCHs are transmitted from the network and whether Multiple Input Multiple Output (MIMO) transmissions are scheduled for any of the component carriers. Thus, even in case only one codeword transmissions are scheduled on two of the five available component carriers, 12 HARQ information bits are needed. Therefore, known fixed-length encoding schemes are limited with regard to performance improvements.

Moreover, existing encoding schemes with fixed-length error correction coding do not provide sufficient error protection levels to the ACK/NACK and DTX indicators. For example, looking at the HARQ message encoding for n=3 component carriers with single-codeword scheduling illustrated in Table 1, serious HARQ operation errors can result if the error correction decoder provides only a single bit error. If e.g. "01000" is mistaken for "01001", the network assumes that the data blocks for the first two component carriers are received correctly even though the UE did not receive the corresponding PDCCH at all. By means of such errors, significant data throughput losses may occur.

Thus, the problem of enhanced error protection for encoding DL HARQ feedback information arises.

SUMMARY

Accordingly, there is a need for a technique of encoding DL HARQ feedback information in an environment supporting aggregated component carriers, which is avoiding at least some of the disadvantages outlined above.

This need is satisfied according to a first method aspect by a method for encoding downlink HARQ feedback information in a mobile station supporting aggregated component carriers comprising the steps of obtaining first HARQ feedback indicators providing information regarding receipt of PDCCH for activated component carriers, obtaining second HARQ feedback indicators providing information regarding decoding of PDSCH codewords carried by the component carriers, encoding the first HARQ feedback indicators into a first coded part, encoding the second HARQ feedback indicators into a second coded part, wherein the first and the second HARQ feedback indicators are encoded separate from each other.

The mobile station may be any kind of wired or mobile communication device like a mobile telephone, a personal digital assistance PDA, a network card, an UE or other mobile communication apparatus. In particular, the mobile station may be any apparatus that is capable of communication via an air interface with a network node, e.g., a NodeB or a base station being deployed in a mobile communication network working according to a 3GPP standard, in particular, the 3GPP LTE/LTE-Advanced standards. Moreover, the mobile station may support data reception/transmission based on two or more (in particular five) component carriers that are aggregated to support wider transmission bandwidths, e.g., up to 100 MHz. An activated component carrier is a carrier on which data for the UE is scheduled.

The first HARQ feedback indicators represent detection success and failure of PDCCHs for different activated component carriers. The second HARQ feedback indicators may be of variable length and represent decoding success and failure of corresponding PDSCH codewords. In particular, the first HARQ feedback indicators may be DTX indicators/bits and the second HARQ feedback indicators may be ACK/NACK indicators/bits. By providing and encoding the first and second HARQ feedback indicators separate from each other, e.g., in a two-stage process, a more efficient and robust encoding can be provided.

To enable more robust error protection, the first HARQ feedback indicators may be encoded with at least a first error protection level and the second HARQ feedback indicators may be encoded with at least a second error protection level, wherein the first and the second error protection levels differ from each other. Thus, different error protection levels can be provided to the separately provided HARQ feedback indicators. Such different error protections levels can be applied since the first and second HARQ feedback indicators are encoded separately, i.e., independent from each other.

According to one aspect, the first HARQ feedback indicators are encoded with a first error protection level that is uniform for the activated component carriers. Thereby, the risk of HARQ buffer corruption and operation errors can be reduced. Moreover, by providing uniform error protection levels for different numbers of activated component carriers, system planning and configuration can be simplified.

According to a further aspect, the second HARQ feedback indicators are encoded with varying error protection levels for the activated component carriers. In particular, the second HARQ feedback indicators may be provided with different bit lengths. Thus, the error protection levels can be varied with the bit lengths of the second HARQ feedback indicators. Hence, stronger error protection can be shifted to the more important HARQ feedback information, e.g., the first HARQ feedback indicators. Thus, given a fixed number of activated component carriers, progressive error protection levels can be provided for different sized second HARQ feedback indicators.

To reduce implementation costs, the first HARQ feedback indicators and the second HARQ feedback indicators may be encoded with error correction codes belonging to the same code family. In particular, Reed-Muller codes may be used for the encoding.

According to a further aspect, the method may comprise the steps of adding at least a part of the first coded part and at least a part of the second coded part to form a third coded part, and providing a joint codeword by at least one of concatenating and multiplexing the first coded part, the second coded part, and the third coded part.

As for a second method aspect, a method for encoding downlink HARQ feedback information in a mobile station supporting aggregated component carriers is provided, the method comprising the steps of obtaining first HARQ feedback indicators providing information regarding receipt of PDCCH for activated component carriers, obtaining a fixed-length representation of second HARQ feedback indicators providing information regarding decoding of PDSCH codewords carried by the component carriers, combining the first HARQ feedback indicators and the fixed-length representation to the HARQ feedback information, and encoding the combined HARQ feedback information.

Within the fixed-length representation, the information of the first HARQ feedback indicators may be reflected. Thus, through redundant representation of the first HARQ feedback indicators, enhanced error protection can be provided. In particular, the redundant representation may be provided before at least one of general and joint forward error correction coding.

In order to further enhance error protection, the fixed-length representation may comprise indicators providing information regarding receipt of PDCCH for activated component carriers. In particular, the further indicators may be DTX indicators. By means of redundant representation of the DTX indicators, error protection can be enhanced. Thereby, more robust encoding is provided.

According to a further aspect, at least one of the first and the second method may comprise the step of appending at least one Scheduling Request (SR) bit to the second HARQ feedback indicators. In this aspect, the SR bit is additionally carried by the second part of the HARQ feedback message while the first HARQ feedback indicators can remain unchanged. Hence, the reliability of the HARQ feedback indicators is not impacted.

At least one of the first and the second method may comprise the further step of reusing dual-codeword second HARQ feedback indicators as single-codeword second HARQ feedback indicators for single-codeword-scheduled component carriers. Thereby, the size of the feedback messages can be reduced.

At least one of the first and the second method may comprise the further step of interleaving the encoded HARQ feedback information.

According to another aspect, a computer program product is provided. The computer program product comprises program code portions for performing one or more of the steps or one or more of the method aspects described herein, when the computer program product is executed on one or more computing devices, in particular, one or more components of a microprocessor. The computer program product may be stored on a computer-readable recording medium such as a permanent or re-writable memory, a CD-Rom, or a DVD. The computer program product may also be provided for download via one of more computer networks, such as the Internet, a cellular telecommunication network or a wireless or wired Local Area Network (LAN).

As for a first hardware aspect, an apparatus for encoding downlink HARQ feedback information is provided. The apparatus supports aggregated component carriers and comprises a first obtaining unit for obtaining first HARQ feedback indicators providing information regarding receipt of PDCCH for activated component carriers, a second obtaining unit for obtaining second HARQ feedback indicators providing information regarding decoding of PDSCH codewords carried by the component carriers, a first encoding unit for encoding the first HARQ feedback indicators into a first coded part, and a second encoding unit for encoding the second HARQ feedback indicators into a second coded part, wherein the first and the second HARQ feedback indicators are encoded separate from each other.

As for a second hardware aspect, an apparatus for encoding downlink HARQ feedback information is provided. The apparatus supports aggregated component carriers and comprises a first obtaining unit for obtaining first HARQ feedback indicators providing information regarding receipt of PDCCH for activated component carriers, a second obtaining unit for obtaining a fixed-length representation of second HARQ feedback indicators providing information regarding decoding of PDSCH codewords carried by the component carriers, a combining unit for combining first HARQ feedback indicators and the fixed-length representation to the HARQ feedback information, and an encoding unit for encoding the combined HARQ feedback information.

As for a third hardware aspect, a mobile station supporting aggregated component carriers and comprising an apparatus for encoding downlink HARQ feedback information is provided.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to E-UTRA, LTE and LTE-Advanced systems, it will be apparent to the skilled person that the invention can also be practiced in context with other systems. Moreover, while the embodiments will be described with reference to specific HARQ feedback indicators having specific bit lengths, the invention can also be practiced with different bit lengths. Furthermore, while the embodiments will be described with reference to specific numbers of aggregated component carriers, the invention can also be practiced with different numbers of component carriers. In particular, in all embodiments, five activated component carriers (as envisioned for 3GPP LTE Rel-10) may be used.

Furthermore, those skilled in the art will appreciate that the functions and processes explained herein below may be implemented using software functioning in conjunction with programmed microprocessors or general-purpose computers. It will also be appreciated that while the embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

Figure 3:
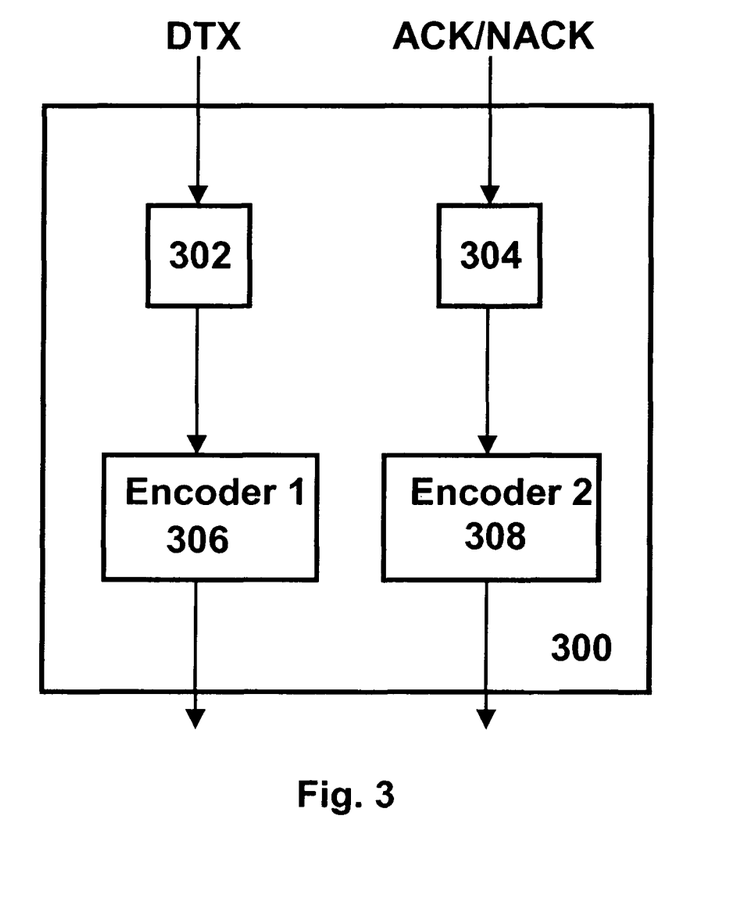
FIG. 3 is a schematic block diagram showing an embodiment of a first apparatus for encoding DL HARQ information.

FIG. 3 is a schematic block diagram showing a first embodiment of an apparatus 300 for encoding DL HARQ information. Apparatus 300 is adapted to obtain and encode DL HARQ feedback information and to support aggregated component carriers, e.g., five component carriers with an aggregated 100 MHz bandwidth. Apparatus 300 comprises a first HARQ feedback indicator obtaining unit 302, a second HARQ feedback indicator obtaining unit 304, a first encoding unit 306, and a second encoding unit 308. First encoding unit 306 and second encoding unit 308 are provided separate from each other, e.g., in two stages. As examples for the for the first and second HARQ feedback indicators, DTX indicators are obtained by first HARQ feedback indicator obtaining unit 302 and ACK/NACK indicators are obtained by second HARQ feedback indicator obtaining unit 304.

Figure 4:
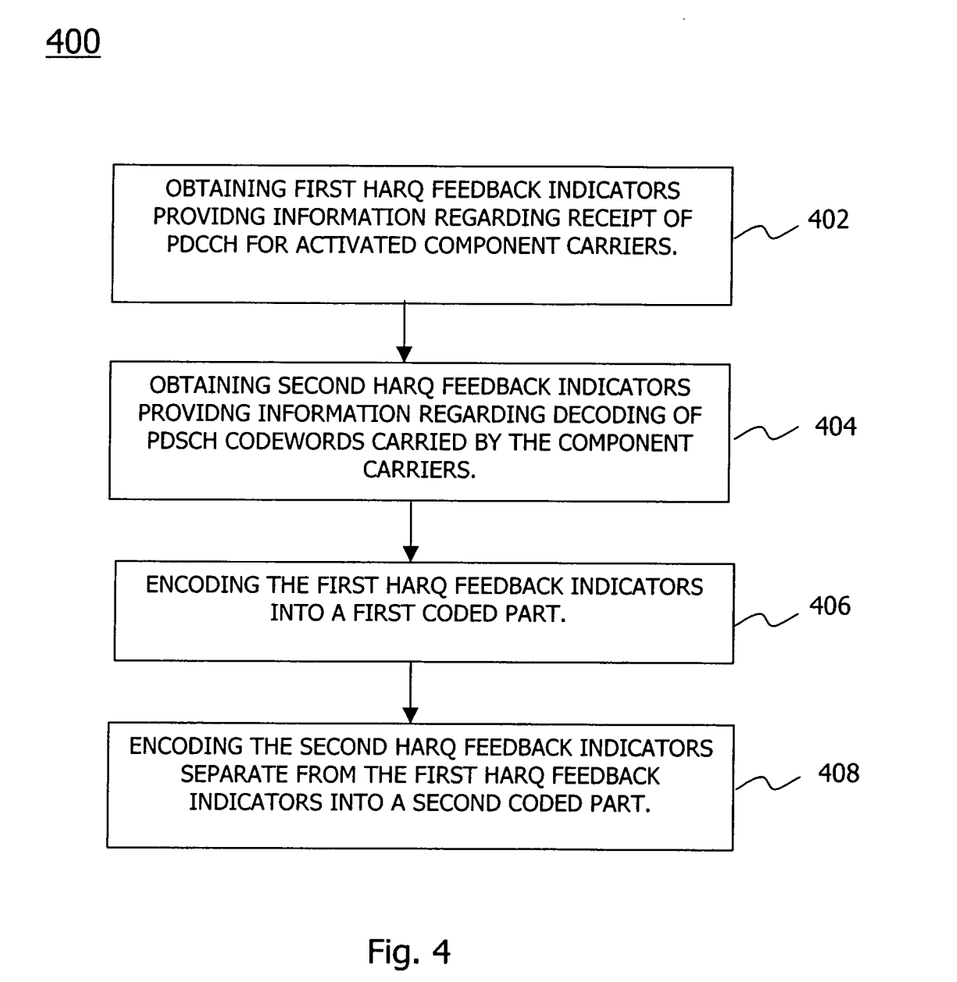
FIG. 4 is a flow chart showing an embodiment of a first method for encoding DL HARQ information.

FIG. 4 is a flow chart illustrating an embodiment of a first method 400 of encoding DL HARQ feedback information. Method 400 can be executed in apparatus 300 shown in FIG. 3 or any other communication apparatus, e.g., a mobile station. Method 400 will be explained with reference to FIGS. 3 and 4.

Method 400 starts in step 402 by obtaining first HARQ feedback indicators in first obtaining unit 302. The first HARQ feedback indicators are providing information regarding receipt of a PDCCH for activated component carriers. In particular, the first HARQ feedback indicators are DTX indicators. To avoid HARQ buffer corruption between different component carriers, DTX indicators have to be signaled correctly for different component carriers. In step 404, second HARQ feedback indicators are obtained by second obtaining unit 304. The second HARQ feedback indicators are providing information regarding decoding of PDSCH codewords carried by the component carriers. In particular, the second HARQ feedback indicators are ACK/NACK indicators.

Thereafter, in step 406, the first HARQ feedback indicators are encoded in first encoding unit 306 into a first coded part. Furthermore, in step 408, the second HARQ feedback indicators are encoded in second encoding unit 308 into a second coded part. The encoding steps 406 and 408 are provided separate from each other. Thereafter, the coded parts can be combined, concatenated, multiplexed and/or interleaved before modulation and transmission.

By separately encoding the first and second HARQ feedback indicators, different error protection levels can be provided to the first and second HARQ feedback indicators. In particular, the first HARQ feedback indicators can be encoded with a first error protection level that is uniform for the activated component carriers. Moreover, the second HARQ feedback indicators can be encoded with varying protection levels for the activated component carriers. For example, the different error protection levels can be controlled based on varying bit lengths of at least one of the first and second HARQ feedback indicators.

Figure 5:
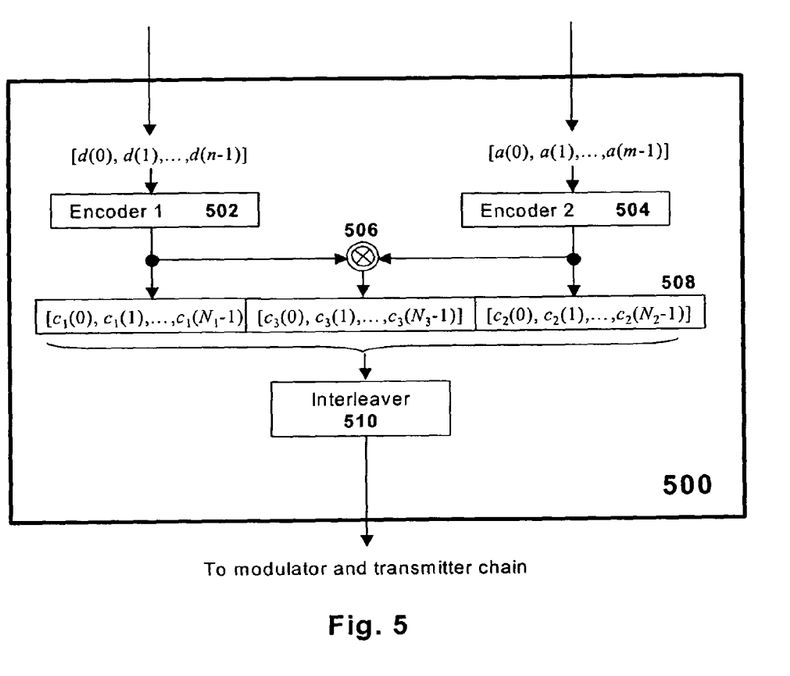
FIG. 5 is a schematic block diagram showing an embodiment of a second apparatus for encoding DL HARQ information.

A second embodiment will we described with reference to FIG. 5. FIG. 5 illustrates a schematic block diagram showing an apparatus 500 for encoding DL HARQ information. FIG. 5 is a more detailed embodiment of the first embodiment according to FIG. 3. Thus, all features described with regard to the first and the second embodiment can be combined. Thus, method 400 may also be executed by apparatus 500. Apparatus 500 is included in an UE (not shown) supporting aggregated component carriers and comprises a first encoder 502, a second encoder 504, an adding unit 506, a joining unit 508, and an interleaving unit 510. Interleaving unit 510 is optional.

In this embodiment, n denotes the number of activated component carriers for the UE. The complete HARQ feedback message is represented in two parts, i.e., in a first part "d" to first encoder 502 and in a second part "a" to second encoder 504.

The first part is an n-bit DTX indicator $d=[d(0), d(1), \ldots, d(n-1)]$. The n-th DTX indicator bit represents whether a PDCCH has been detected for the n-th component carrier. Moreover, the second part are m-bit ACK/NACK bits $a=[a(0), a(1), \ldots, a(m-1)]$. Therein, m denotes the total number of ACK/NACK bits that are reporting based on the number of received PDCCHs and the number of codewords scheduled on the corresponding component carriers.

For a component carrier without a scheduled PDCCH, no ACK/NACK bits are required. Moreover, for a component carrier being single-codeword scheduled, one ACK/NACK bit is required. Further, for a component carrier being dual-codeword scheduled, two ACK/NACK bits are generally required. If the system further employs bundling of spatial ACK/NACK, only one ACK/NACK bit is required.

Within encoder 502, the DTX indicator bits $d=[d(0), d(1), \ldots, d(n-1)]$ are encoded into $c_1=[c_1(0), c_1(1), \ldots, c_1(N_1-1)]$ by a $(N_1, n)$ code, where $N_1$ is the length of the forward error correction code. Moreover, within encoder 504, the ACK/NACK bits $a=[a(0), a(1), \ldots, a(m-1)]$ are encoded into $c_2=[c_2(0), c_2(1), \ldots, c_2(N_2-1)]$ by a $(N_2, m)$ code, where $N_2$ is the length of the forward error correction code.

After the encoding, adding unit 506 adds the two coded parts $c_1$ and $c_2$ partially or entirely to form a third coded part, i.e., $c_3(k)=c_1(k) \otimes c_2(k)$ for $k=0, 1, \ldots, N_3-1$. The addition operation provided in adding unit 506 is in the GF(2) sense.

Subsequently, in joining unit 508, the three coded parts $c_1$, $c_1$ and $c_1$ are at least one of concatenated and multiplexed together to form a joint codeword $c=[c(0), c(1), \ldots, c(N-1)]$ of length N. Before modulation and transmission, the joint codeword can optionally be interleaved by interleaving unit 510.

At the network side (not shown), the DTX indicators are first decoded. Along with the scheduling history available at the network, the actual lengths of the ACK/NACK bits are further determined. After m is determined, the ACK/NACK bits can be decoded.

The following third embodiment is based on the second embodiment according to FIG. 5. The third embodiment assumes PUCCH with a size of N=48 bits.

In this embodiment, the three coded parts $c_1$, $c_2$ and $c_3$ are set to be of equal size, i.e., $N_1=N_2=N_3=16$. The n-bit DTX indicator $d=[d(0), d(1), \ldots, d(n-1)]$ is encoded by a (16, n) code into $c_1=[c_1(0), c_1(1), \ldots, c_1(15)]$. The m-bit ACK/NACK indicators $a=[a(0), a(1), \ldots, a(m-1)]$ are encoded by a (16, m) code into $c_2=[c_2(0), c_2(1), \ldots, c_2(15)]$. The third coded part is obtained by taking the GF(2) sum of the first two coded parts, i.e., $c_3(k)=c_1(k) \otimes c_2(k)$ for $k=0, 1, \ldots, 15$.

The error protection levels for the two feedback information components can be represented by the effective minimum distances, $D_{min}$, of the entire encoding process. A higher $D_{min}$ corresponds to stronger error protection and a lower error probability after decoding. Generally speaking, better error protection levels can be achieved by employing the best component codes for the DTX indicator and the ACK/NACK bits. Thus, for n or m inputs having different lengths, different encoders can be used at the UE and different decoders can be used at the network side.

It is further advantageous to employ codes from the same code family (e.g., Reed-Muller codes) such that the same or similar decoding hardware and algorithms can be reused for reducing implementation costs. Due to good performance and efficient decoding, the two length-16 component codes for the DTX indicator and the ACK/NACK bits may be at least one of sub-codes of the $1^{st}$ order (16,5) Reed-Muller code and the $2^{nd}$ order (16,11) Reed-Muller code. The effective minimum distances for the two HARQ feedback components are shown in Table 3. Alternatively, convolutional codes or coded from short block code families can be used.

TABLE 3

Effective minimum distances for protecting the DTX indicator and the ACK/NACK bits with length-16 Reed-Muller component encoders

| Effective Protection for DTX Indicator | | Effective Protection for ACK/NACK Bits | |
|---|---|---|---|
| n | $D_{min}$ | m | $D_{min}$ |
| 2 | 16 | 1 | 32 |
| 3 | 16 | 2 | 16 |
| 4 | 16 | 3 | 16 |
| 5 | 16 | 4 | 16 |
| | | 5 | 16 |
| | | 6 | 8 |
| | | 7 | 8 |
| | | 8 | 8 |
| | | 9 | 8 |
| | | 10 | 8 |

In another embodiment, N may also depend on the number of activated component carriers.

In the first, second and third embodiments, the following advantages are obtained:

Irrespective of the lengths of the ACK/NACK bits, strong error protection can provided to the DTX indicators. Thereby, the risk of HARQ buffer corruption and operation errors is reduced. Since the error protection level for the DTX indicators is uniform for different numbers of activated component carriers, system planning and configuration is simplified. Moreover, the error protection level for the ACK/NACK bits varies with the length of these bits. When the message is short, stronger error protection is provided. When the message is long (indicating that multiple dual-codewords have been scheduled), weaker error protection is employed in order to maintain stronger protection for the more important DTX indicators. Since the later cases are more likely when the UE is in higher Signal to Interference plus Noise Ratio (SINR) operation conditions, the lowered reliability on the ACK/NACK bits has a small impact on data throughput.

Figure 6:
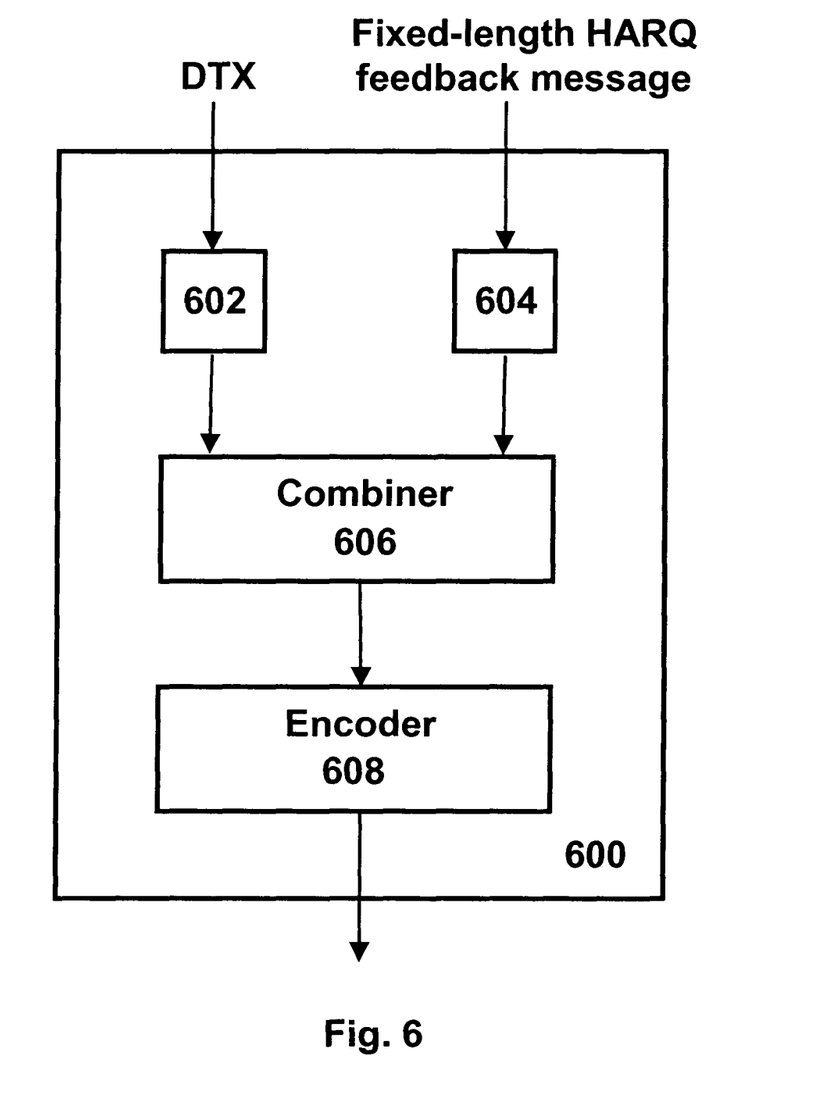
FIG. 6 is a schematic block diagram showing an embodiment of a third apparatus for encoding DL HARQ information.

A fourth embodiment will we described with reference to FIG. 6. FIG. 6 illustrates a schematic block diagram showing an apparatus 600 for encoding DL HARQ information. Apparatus 600 is adapted to obtain and encode DL HARQ feedback information and to support aggregated component carriers, e.g., five component carriers of an aggregated 100 MHz bandwidth. Apparatus 600 comprises a first obtaining unit 602 for obtaining first HARQ feedback indicators providing information regarding receipt of PDCCH for activated component carriers, a second obtaining unit 604 for obtaining a fixed-length representation of second HARQ feedback indicators providing information regarding decoding of PDSCH codewords carried by the component carriers, a combining unit 606 for combining the first HARQ feedback indicators and the fixed-length representation to the HARQ feedback information, and an encoding unit 608 for encoding the combined HARQ feedback information.

Figure 7:
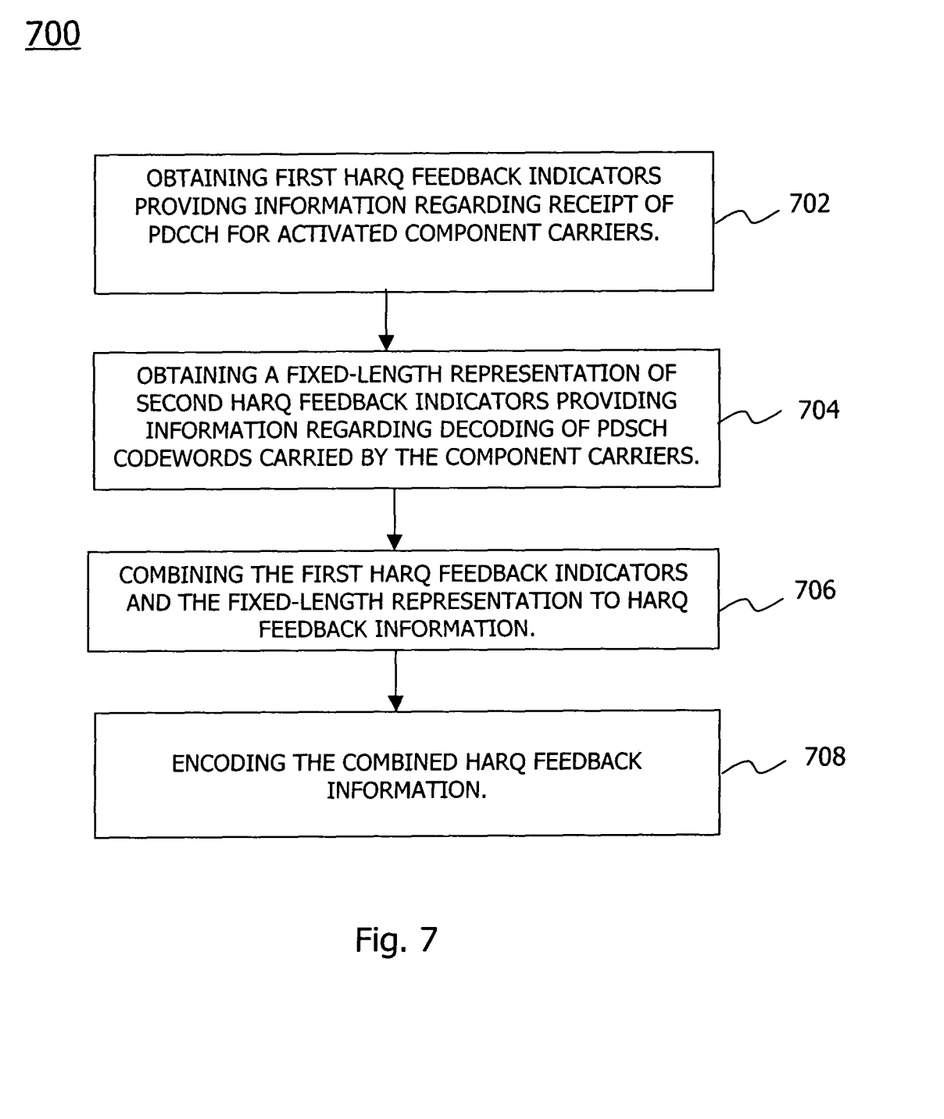
FIG. 7 is a flowchart shown an embodiment of a second method for encoding DL HARQ feedback information.

FIG. 7 is a flow chart illustrating an embodiment of a second method 700 of encoding DL HARQ feedback information. Method 700 can be executed in apparatus 600 shown in FIG. 6 or any other communication apparatus, e.g., a mobile station. Method 600 will be explained with reference to FIGS. 6 and 7.

Method 700 starts in step 702 by obtaining first HARQ feedback indicators by first obtaining unit 602. First HARQ feedback indicators provide information regarding receipt of PDCCH for activated component carriers. In particular, first HARQ feedback indicators may be DTX indicators. In step 704, second obtaining unit 604 obtains a fixed-length representation of second HARQ feedback indicators providing information regarding decoding of PDSCH codewords carried by the component carriers. The fixed-length presentation may comprise indicators providing information regarding receipt of PDCCH for activated component carriers. Thus, the fixed-length representation may be a non-variable length representation of ACK/NACK indicators or a fixed-length representation of HARQ feedback messages. Thereafter, in step 706, combining unit 606 combines the first HARQ feedback indicators and the fixed-length representation to the HARQ feedback information. In subsequent step 708, encoder 608 encodes the combined HARQ feedback information. Thus, through redundant representation of the first HARQ feedback information, enhanced error protection can be provided.

In the following fifth embodiment, simplified unequal error protection to different feedback messages through redundant representation of the first HARQ feedback information is explained. The fifth embodiment is based on the fourth embodiment according to FIGS. 6 and 7. In this embodiment, the DTX indicator bits are combined with a fixed-length representation of HARQ feedback messages. For example, the fixed-length representation may signal three possible HARQ messages per component carrier, i.e., {ACK, NACK, DTX}. The fixed-length representation may be based on DL HARQ feedback message encoding for n=3 component carriers with single-codeword scheduling, as e.g. shown in Table 1.

In this embodiment, n denotes the number of activated component carriers for the UE. The input to the error correction encoder is of length n+k, where k=$\lceil \log_2(5^n-1) \rceil$. The first HARQ feedback indicators obtained by first obtaining unit 602, i.e., the first n bits, are DTX indicators representing whether a PDCCH has been received for the n-th component carrier. Furthermore, the subsequent k bits obtained by second obtaining unit 604 constitute a fixed-length representation of the HARQ feedback message. In other words, the k bits are the binary representation of the value given by $$\sum_{i=0}^{n-1} M_i \cdot 5^i,$$

where $M_i=4$ if no corresponding PDCCH has been detected for the ith component carrier, $M_i=3$ if a corresponding PDCCH has been detected for the ith component carrier and the feedback message is (NACK, NACK), $M_i=2$ if a corresponding PDCCH has been detected for the ith component carrier and the feedback message is (NACK, ACK), $M_i=1$ if a corresponding PDCCH has been detected for the ith component carrier and the feedback message is (ACK, NACK), and $M_i=0$ if a corresponding PDCCH has been detected for the ith component carrier and the feedback message is (ACK, ACK).

To reduce the sizes of the HARQ feedback messages, the dual-codeword feedback messages may be reused for single-codeword feedback messages. For example, (NACK, NACK) can be used for (NACK) and (ACK, ACK) can be used for (ACK). Applying this principle on the example illustrated in Table 2, it is not necessary to provide seven possible HARQ messages in all system setups. Since the PDCCH in 3GPP LTE is protected with strong CRC codes for error detection, it is unlikely that an UE would mistake a two-codeword scheduling from the network as a one-codeword scheduling (or vice versa). Hence, it is possible to reuse the (ACK, ACK) and (NACK, NACK) messages as the (ACK) and (NACK) responses for a component carrier with one-codeword scheduling. With this, it is possible that $\lceil \log_2(5^n-1) \rceil$ binary bits represent all necessary HARQ messages for n component carriers with flexible MIMO scheduling.

In this fifth embodiment, the entire HARQ feedback information is subsequently encoded by a (N, n+k) code, where N is the length of the forward error correction code. The encoded bits can optionally be interleaved before modulation and transmission.

The sequential orders of the HARQ feedback information bits can be further modified. For example, if a tail-terminator convolutional code is used, the DTX indicator bits can be distributed at the beginning and the end of the sequence. This provides better reliability. This modification can also be applied to all aforementioned embodiments.

At the network side, a single decoder is employed. The two parts of the decoded outcome are checked against each other. If a decoding error occurs, the network can detect this since the two parts do not match each other. This reduces the risk of HARQ buffer corruption and other serious operation errors.

The following sixth embodiment is based on the fourth and fifth embodiments. The sixth embodiment assumes a length of the forward error correction code of N=48 bits. Different kinds of encoders may be used for the encoding.

For example, circular repetition of the $2^{nd}$ order (32, n+k) Reed-Muller code can be used. For such encoding, the minimum distance of the entire HARQ feedback message is shown in Table 4.

TABLE 4

Minimum distances for protecting the entire HARQ feedback information with $2^{nd}$ order length-32 Reed-Muller encoders and circular repetition

| n | (N, n + k) | $D_{min}$ |
|---|---|---|
| 2 | (48, 7) | 16 |
| 3 | (48, 10) | 15 |
| 4 | (48, 14) | 8 |
| 5 | (48, 17) | NA |

As another example, a convolutional encoder (such as a tail-biting encoder) can be used. For this encoding, the free distance of the convolutional code is 10 at a code rate ⅓. At higher rates, the free distance is lower.

As a further example, a combination of the $2^{nd}$ order Reed-Muller code can be used for short payload sizes and the tail-biting convolutional code can be used for longer payload sizes.

If the system employs bundling of spatial ACK/NACK bits, the length of the second HARQ feedback part can be reduced to k'=⌈$\log_2(3^n-1)$⌉. In this case, the second HARQ feedback part constitutes a fixed-length representation of the HARQ feedback message (as e.g. shown in Table 1). Thus, the k' bits are the binary representation of the value given by $$\sum_{i=0}^{n-1} M_i \cdot 3^i,$$

where
$M_i$=2 if no corresponding PDCCH has been detected for the ith component carrier,
$M_i$=1 if a corresponding PDCCH has been detected for the ith component carrier and the feedback message is (NACK), and $M_i$=0 if a corresponding PDCCH has been detected for the ith component carrier and the feedback message is (ACK).

As an example for N=48 bits, circular repetition of the $2^{nd}$ order (32, n+k') Reed-Muller code can be applied. For this example, the minimum distance of the entire HARQ feedback message is shown in Table 5

TABLE 5

Minimum distances for protecting the entire HARQ feedback information with $2^{nd}$ order length-32 Reed-Muller encoders and circular repetition when bundling of spatial ACK/NACK is adopted

| n | (N, n + k') | $D_{min}$ |
|---|---|---|
| 2 | (48, 5) | 22 |
| 3 | (48, 8) | 16 |
| 4 | (48, 11) | 10 |
| 5 | (48, 13) | 10 |

In the following seventh embodiment, simplified unequal error protection to different feedback messages through redundant representation of the first HARQ feedback information is explained. The seventh embodiment is based on the fourth embodiment according to FIGS. 6 and 7. In this embodiment, the DTX indicator bits (e.g., as described in the first embodiment according to FIGS. 3 and 4 and the second embodiment according to FIG. 5) are combined with a non-variable-length representation of the ACK/NACK bits.

Further, n denotes the number of activated component carriers for the UE. The input to the error correction encoders is of length 3n. The first HARQ feedback indicators obtained by first obtaining unit 602, i.e., the first n bits, are DTX indicators representing whether a PDCCH has been received for the n-th component carrier. Furthermore, the subsequent k bits obtained by second obtaining unit 604 constitute a non-variable-length representation of the HARQ feedback message for the n activated component carriers (even for those for which no corresponding PDCCH has been detected).

For a component carrier with a detected PDCCH, two bits are used to represent the generally possible ACK/NACK messages, i.e., {(ACK, ACK), (ACK, NACK), (NACK, ACK), (NACK, NACK)}. To reduce HARQ feedback sizes, the dual-codeword feedback messages can be reused for single-codeword feedback messages (e.g., (NACK, NACK) can be used for (NACK) and (ACK, ACK) can be used for (ACK)). For a component carrier with no detected PDCCH, (NACK, NACK) is represented with two bits.

The entire HARQ feedback information is encoded by a (N,3n) code, where N is the length of the forward error correction code. Similar to the fifth embodiment, the sequential orders of the HARQ feedback information bits and the encoded bits can be further modified.

At the network side, a single decoder is employed. Therein, the two decoded parts are checked against each other. If a decoding error occurs, the network can detect such an event since the two parts do not match each other. This reduces the risk that HARQ buffer corruption and other serious operation errors occur.

The encoding schemes discussed in the sixth embodiment, i.e., circular repetition of the $2^{nd}$ order (32,n+k) Reed-Muller codes, tail-biting convolutional coding or combinations thereof can also be used in this embodiment.

As an example for an N=48 bits embodiment, circular repetition of the $2^{nd}$ order (32,3n) Reed-Muller code can be applied to all n=2, 3, 4, 5 cases. For these cases, the minimum distance of the entire HARQ feedback message is shown in Table 6.

TABLE 6

Minimum distances for protecting the entire HARQ feedback information with $2^{nd}$ order length-32 Reed-Muller encoders and circular repetition

| n | (N, 3n) | $D_{min}$ |
|---|---|---|
| 2 | (48, 6) | 20 |
| 3 | (48, 9) | 15 |

TABLE 6-continued

Minimum distances for protecting the entire HARQ feedback information with $2^{nd}$ order length-32 Reed-Muller encoders and circular repetition

| n | (N, 3n) | $D_{min}$ |
|---|---------|-----------|
| 4 | (48, 12) | 10 |
| 5 | (48, 15) | 8 |

If the system employs bundling of spatial ACK/NACK bits, the length of the second HARQ feedback part can be reduced to only n bits. For the N=48 bits embodiment, circular repetition of the $2^{nd}$ order (32,2n) Reed-Muller code can be applied. The minimum distance of the entire HARQ feedback message is shown in Table 7.

TABLE 7

Minimum distances for protecting the entire HARQ feedback information with $2^{nd}$ order length-32 Reed-Muller encoders and circular repetition when bundling of spatial ACK/NACK is adopted

| n | (N, 2n) | $D_{min}$ |
|---|---------|-----------|
| 2 | (48, 4) | 22 |
| 3 | (48, 6) | 20 |
| 4 | (48, 8) | 16 |
| 5 | (48, 10) | 15 |

All of the first to seventh embodiments can be extended such that the DL HARQ feedback information additionally carries SR bits. This aspect can be implemented by keeping the first part of the DL HARQ feedback information, i.e., the first HARQ feedback indicator, intact and appending the SR bit to the second part of the DL HARQ feedback information. Thus, the same encoding and decoding methods and apparatuses can be maintained.

The following eighth embodiment is based on the first embodiment according to FIGS. 3 and 4 and the second embodiment according to FIG. 5. In this embodiment, n denotes the number of activated component carriers for the UE. The HARQ feedback and SR bits are provided in two parts, i.e., a first part with an n-bit DTX indicator d=[d(0), d(1), . . . , d(n−1)], whereas the n-th DTX indicator bit represents whether a PDCCH has been received for the n-th component carrier, and a second part with (m+1)-bit ACK/NACK and SR bits a=[a(0), a(1), . . . , a(m)], whereas (m+1) denotes the total number of SR and ACK/NACK bits for reporting based on the number of received PDCCHs and the number of codewords scheduled on the corresponding component carriers.

For a component carrier without a correspondingly scheduled PDCCH, no ACK/NACK bits are required. For a component carrier with single-codeword scheduling, one ACK/NACK bit is required. Moreover, for a component carrier with dual-codeword scheduling, two ACK/NACK bits are generally required. Furthermore, if the system employs bundling of spatial ACK/NACK, one ACK/NACK bit is required.

Thus, the combined HARQ feedback and SR bits can be encoded with the methods and apparatuses disclosed in the first and second embodiments. This combined encoding is particularly suitable with length-16 Reed-Muller component encoders. The addition of the SR bit does not impact the reliabilities of other HARQ feedback bits, as can be seen from Table 8.

TABLE 8

Effective minimum distances for protecting the DTX indicator and the SR and ACK/NACK bits with length-16 Reed-Muller component encoders

| Effective Protection for DTX Indicator | | Effective Protection for SR and ACK/NACK Bits | |
|---|---|---|---|
| n | $D_{min}$ | m + 1 | $D_{min}$ |
| 2 | 16 | 2 | 16 |
| 3 | 16 | 3 | 16 |
| 4 | 16 | 4 | 16 |
| 5 | 16 | 5 | 16 |
|   |    | 6 | 8 |
|   |    | 7 | 8 |
|   |    | 8 | 8 |
|   |    | 9 | 8 |
|   |    | 10 | 8 |
|   |    | 11 | 8 |

The following ninth embodiment is based on the seventh embodiment. The aspects and principles explained in this embodiment can also be applied to the fifth embodiment. In this embodiment, n denotes the number of activated component carriers for the UE. It is assumed that the input to the joint error correction encoder is of length 3n+1. As to the encoder input bits, the first n bits are DTX indicators representing whether a PDCCH has been received for the n-th component carrier, and the subsequent 2n bits constitute a non-variable-length representation of the HARQ feedback message for the n activated component carriers (even for those where no corresponding PDCCH has been detected), as described in the seventh embodiment. Furthermore, the last bit is the SR bit. The entire HARQ feedback information is encoded by a (N,3n+1) code, where N is the length of the forward error correction code.

At the network side, a single decoder is employed. The two decoded outcome parts are checked against each other. If a decoding error occurs, the network can detect such an event since the two parts do not match each other.

As can be seen from Table 9, for the embodiment of N=48 bits, the inclusion of the additional SR bit does not reduce the minimum distances for the n=3, 4, 5 cases.

TABLE 9

Minimum distances for protecting the entire HARQ feedback information with $2^{nd}$ order length-32 Reed-Muller encoders and circular repetition

| n | (N, 3n + 1) | $D_{min}$ |
|---|-------------|-----------|
| 2 | (48, 7) | 16 |
| 3 | (48, 10) | 15 |
| 4 | (48, 13) | 10 |
| 5 | (48, 16) | 8 |

Further, if the system employs bundling of spatial ACK/NACK, the length of the second HARQ feedback part can be reduced to only n bits. For the N=48 bits embodiment, circular repetition of the $2^{nd}$ order (32,2n+1) Reed-Muller code can be applied. The minimum distance of the entire HARQ feedback message is shown in Table 10.

TABLE 10

Minimum distances for protecting the entire HARQ feedback information with $2^{nd}$ order length-32 Reed-Muller encoders and circular repetition

| n | (N, 2n + 1) | $D_{min}$ |
|---|---|---|
| 2 | (48, 5) | 22 |
| 3 | (48, 7) | 16 |
| 4 | (48, 9) | 15 |
| 5 | (48, 11) | 10 |

Figure 8:
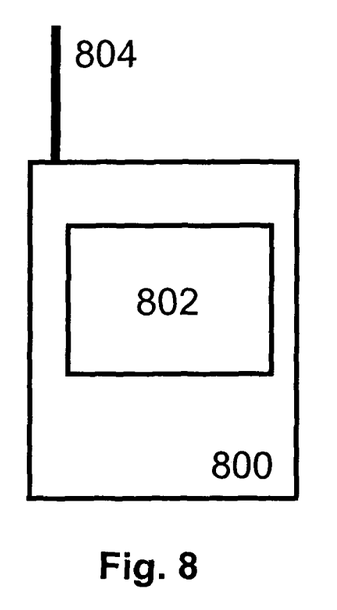
FIG. 8 is a schematic block diagram showing an embodiment of a mobile station comprising an apparatus for encoding DL HARQ information.

FIG. 8 is a schematic block diagram showing an embodiment of a mobile station 800 comprising an apparatus 802 for encoding DL HARQ feedback information and an antenna 804. Apparatus 802 may comprise any one of apparatus 300 shown in FIG. 3, apparatus 500 shown in FIG. 5, and apparatus 600 shown in FIG. 6.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method for encoding downlink Hybrid Automatic Repeat Request (HARQ) feedback information in a mobile station supporting aggregated component carriers comprising:
    obtaining, by a first obtaining hardware of the mobile station, Discontinuous Transmission (DTX) indicators comprising a first DTX representation indicating whether respective Physical Downlink Shared Channel (PDSCH) codewords have been detected for corresponding activated component carriers;
    obtaining, by a second obtaining hardware of the mobile station, a fixed-length representation of HARQ feedback indicators, the fixed-length representation configured to signal one of an ACK, a NACK, and a DTX indicator for respective component carriers and comprising a second DTX representation that is redundant to the first DTX representation;
    combining, by a combining hardware of the mobile station, the DTX indicators and the fixed-length representation into combined HARQ feedback information;
    encoding, by an encoding hardware of the mobile station, the combined HARQ feedback information such that the redundancy between the first and second DTX representations is maintained; and
    transmitting, by a transmission hardware of the mobile station, the combined HARQ feedback information towards a network node in a wireless communications network.

2. The method of claim 1, further comprising appending, by the encoding hardware, at least one Scheduling Request bit to the HARQ feedback indicators.

3. The method of claim 1, wherein the encoding, by the encoding hardware, of the combined HARQ feedback information comprises encoding the HARQ feedback indicators by using at least one of:
    a dual-codeword {ACK, ACK} in place of a single-codeword-scheduled {ACK}; and
    a dual-codeword {NACK, NACK} in place of a single-codeword-scheduled {NACK}.

4. The method of claim 1, further comprising the encoding hardware using Reed-Muller codes for the encoding.

5. The method of claim 1, further comprising the encoding hardware interleaving the encoded combined HARQ feedback information.

6. A computer program product stored in a non-transitory computer readable medium for controlling a mobile computing device, the computer program product comprising software instructions which, when run on the mobile computing device, causes:
    a first obtaining hardware of the mobile computing device to obtain Discontinuous Transmission (DTX) indicators comprising a first DTX representation indicating whether respective Physical Downlink Shared Channel (PDSCH) codewords have been detected for corresponding activated component carriers;
    a second obtaining hardware of the mobile computing device to obtain a fixed-length representation of Hybrid Automatic Repeat Request (HARQ) feedback indicators, the fixed-length representation configured to signal one of an ACK, a NACK, and a DTX indicator for respective component carriers and comprising a second DTX representation that is redundant to the first DTX representation;
    a combining hardware of the mobile computing device to combine the DTX indicators and the fixed-length representation into combined HARQ feedback information;
    an encoding hardware of the mobile computing device to encode the combined HARQ feedback information such that the redundancy between the first and second DTX representations is maintained; and
    a transmission hardware of the mobile computing device to transmit the combined HARQ feedback information towards a network node in a wireless communications network.

7. A hardware encoder of a mobile station operative to encode downlink Hybrid Automatic Repeat Request (HARQ) feedback information, the hardware encoder supporting aggregated component carriers and comprising:
    first obtaining hardware configured to obtain Discontinuous Transmission (DTX) indicators comprising a first DTX representation indicating whether respective Physical Downlink Shared Channel (PDSCH) codewords have been detected for corresponding activated component carriers;
    second obtaining hardware configured to obtain a fixed-length representation of Hybrid Automatic Repeat Request (HARQ) feedback indicators, the fixed-length representation configured to signal one of an ACK, a NACK, and a DTX indicator for respective component carriers and comprising a second DTX representation that is redundant to the first DTX representation;
    combining hardware configured to combine the DTX indicators and the fixed-length representation into combined HARQ feedback information;
    encoding hardware configured to encode the combined HARQ feedback information such that the redundancy between the first and second DTX representations is maintained; and
    transmission hardware configured to transmit the combined HARQ feedback information towards a network node in a wireless communications network.

8. A mobile station supporting aggregated component carriers and comprising:
    first obtaining hardware configured to obtain Discontinuous Transmission (DTX) indicators comprising a first DTX representation indicating whether respective Physical Downlink Shared Channel (PDSCH) codewords have been detected for corresponding activated component carriers;

second obtaining hardware configured to obtain a fixed-length representation of Hybrid Automatic Repeat Request (HARQ) feedback indicators, the fixed-length representation configured to signal one of an ACK, a NACK, and a DTX indicator for respective component carriers and comprising a second DTX representation that is redundant to the first DTX representation;

combining hardware configured to combine the DTX indicators and the fixed-length representation into combined HARQ feedback information;

encoding hardware configured to encode the combined HARQ feedback information such that the redundancy between the first and second DTX representations is maintained; and transmission hardware configured to transmit the combined HARQ feedback towards a network node in a wireless communications network.

* * * * *